United States Patent
Kojima et al.

(10) Patent No.: US 9,082,525 B2
(45) Date of Patent: Jul. 14, 2015

(54) LITHIUM SILICATE-BASED COMPOUND AND PRODUCTION PROCESS FOR THE SAME, POSITIVE-ELECTRODE ACTIVE MATERIAL AND POSITIVE ELECTRODE FOR USE IN LITHIUM-ION SECONDARY BATTERY AS WELL AS SECONDARY BATTERY

(71) Applicants: KABUSHIKI KAISHA TOYOTA JIDOSHOKKI, Kariya-shi, Aichi (JP); NATIONAL INSTITUTE OF ADVANCED INDUSTRIAL SCIENCE AND TECHNOLOGY, Chiyoda-ku, Tokyo (JP)

(72) Inventors: Akira Kojima, Kariya (JP); Toshikatsu Kojima, Ikeda (JP); Mitsuharu Tabuchi, Ikeda (JP); Tetsuo Sakai, Ikeda (JP); Takuhiro Miyuki, Ikeda (JP); Junichi Niwa, Kariya (JP); Kazuhito Kawasumi, Kariya (JP); Masakazu Murase, Kariya (JP)

(73) Assignees: KABUSHIKI KAISHA TOYOTA JIDOSHOKKI, Aichi (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/362,800

(22) PCT Filed: Oct. 12, 2012

(86) PCT No.: PCT/JP2012/006559
§ 371 (c)(1),
(2) Date: Jun. 4, 2014

(87) PCT Pub. No.: WO2013/084396
PCT Pub. Date: Jun. 13, 2013

(65) Prior Publication Data
US 2014/0332718 A1 Nov. 13, 2014

(30) Foreign Application Priority Data
Dec. 7, 2011 (JP) ................................. 2011-267575

(51) Int. Cl.
*H01M 4/36* (2006.01)
*H01M 4/525* (2010.01)
(Continued)

(52) U.S. Cl.
CPC ........ *H01B 1/08* (2013.01); *C01B 33/32* (2013.01); *H01M 4/1315* (2013.01);
(Continued)

(58) Field of Classification Search
CPC .......... H01M 4/1315; H01M 4/13915; H01M 4/364; H01M 4/505; H01M 4/582; H01M 4/5825; H01M 4/525; C01B 33/32; H01B 1/08
See application file for complete search history.

(56) References Cited

U.S. PATENT DOCUMENTS 7,041,239 B2 * 5/2006 Barker et al. .............. 252/521.5

FOREIGN PATENT DOCUMENTS

CN 101707248 A * 5/2010
JP 2001-266882 A 9/2001
(Continued)

OTHER PUBLICATIONS

Translation of CN 101707248 A, Xicheng et al.*

*Primary Examiner* — Mark Kopec
*Assistant Examiner* — Matthew R Diaz
(74) *Attorney, Agent, or Firm* — Sughrue Mion, PLLC (57) ABSTRACT

A lithium silicate-based compound according to the present invention is expressed by a general formula, $Li_{(2-a+b)}A_a Mn_{(1-x-y)}Co_xM_ySiO_{(4+\alpha)}Cl_\beta$ (In the formula: "A" is at least one element selected from the group consisting of Na, K, Rb and Cs; "M" is at least one member selected from the group consisting of Mg, Ca, Al, Ni, Fe, Nb, Ti, Cr, Cu, Zn, Zr, V, Mo and W; and the respective subscripts appear to be as follows: $0 \le "a" < 0.2$; $0 \le "b" < 1$; $0 < "x" < 1$; $0 \le "y" \le 0.5$; $-0.25 \le "\alpha" \le 1.25$; and $0 \le "\beta" \le 0.05$). The lithium silicate-based compound is used as a positive-electrode active material for secondary battery whose discharge average voltage is higher, and which is able to sorb and desorb lithium ions.

22 Claims, 5 Drawing Sheets (51) Int. Cl.
*H01M 4/1315* (2010.01)
*H01M 4/13915* (2010.01)
*H01M 4/505* (2010.01)
*H01M 4/58* (2010.01)
*H01M 10/052* (2010.01)
*H01B 1/08* (2006.01)
*C01B 33/32* (2006.01)

(52) U.S. Cl.
CPC ......... *H01M 4/13915* (2013.01); *H01M 4/364* (2013.01); *H01M 4/505* (2013.01); *H01M 4/525* (2013.01); *H01M 4/5825* (2013.01); *H01M 10/052* (2013.01); *Y02E 60/122* (2013.01); *Y02T 10/7011* (2013.01)

(56) References Cited

FOREIGN PATENT DOCUMENTS

| | | | |
|---|---|---|---|
| JP | 2007-335325 | A | 12/2007 |
| JP | 2008-218303 | A | 9/2008 |
| JP | 2009-170401 | A | 7/2009 |
| JP | 2010-257592 | A | 11/2010 |
| WO | 2010/089931 | A1 | 8/2010 |

\* cited by examiner

LITHIUM SILICATE-BASED COMPOUND AND PRODUCTION PROCESS FOR THE SAME, POSITIVE-ELECTRODE ACTIVE MATERIAL AND POSITIVE ELECTRODE FOR USE IN LITHIUM-ION SECONDARY BATTERY AS WELL AS SECONDARY BATTERY

CROSS REFERENCE TO RELATED APPLICATIONS

This is a National Stage of International Application No. PCT/JP2012/006559 filed Oct. 12, 2012, claiming priority based on Japanese Patent Application No. 2011-267575 filed Dec. 7, 2011, the contents of all of which are incorporated herein by reference in their entirety.

TECHNICAL FIELD

The present invention relates to a lithium silicate-based compound, which is useful mainly as a positive-electrode active material for secondary battery and which is able to occlude (or sorb) Li ions therein and release (or desorb) them therefrom, and a production process for the same, and to a positive-electrode active material and positive electrode for use in secondary battery, as well as to a secondary battery.

BACKGROUND ART

Since secondary batteries, in which active materials being able to sorb and desorb lithium ions are used, have small sizes and high energy densities, they have been used widely as a power source for portable electronic devices. Moreover, in recent years, it has been investigated to make even vehicles have the secondary batteries on-board.

A positive-electrode active material for such secondary batteries, layered oxides, such as $LiCoO_2$ and $LiMn_2O_4$, have been made use of mainly. In these compounds, however, oxygen atoms coordinate with transition metals to form the skeleton of crystal structure, and lithium ions then come into the spaces between them, thereby making the crystal structure stable. Accordingly, in an overcharged state where the lithium ions have been pulled out more than the setup, it becomes difficult to retain the crystal structure so that the crystal structure becomes likely to collapse. On this occasion, oxygen becomes likely to generate. Consequently, the oxidative exothermic decomposition reactions of nonaqueous electrolytic solutions have been brought about, thereby resulting in declines in the safety of battery.

In recent years, it has been proposed to use lithium phosphate-based compounds, such as $LiMPO_4$ (where "M" is a metal, such as Mn, Fe or Co), as a positive-electrode active material. Since the lithium phosphate-based compounds have $PO_4^{3-}$ polyanions that are disposed around the central metal "M" and whose hetero element is of greater electronegativity, it has been said that the thermal stability is high, compared with that of layered $LiCoO_2$, and the like, in which the oxygen atoms coordinate directly with the transition metal.

Moreover, as polyanion-based compounds that can be used as a positive-electrode active material, lithium silicate-based compounds can also be given. As for specific examples of such lithium silicate-based compounds, $Li_2MnSiO_4 Li_2CoSiO_4$, and so on, can be given, as disclosed in Japanese Unexamined Patent Publication (KOKAI) Gazette No. 2008-218303. Moreover, it is disclosed in Japanese Unexamined Patent Publication (KOKAI) Gazette No. 2009-170401 and Japanese Unexamined Patent Publication (KOKAI) Gazette No. 2001-266882 to use $Li_2MnSiO_4$ along with another oxide to produce a solid solution and then use the resulting solid solution as a positive-electrode active material.

It is possible to expect that $Li_2MnSiO_4$ and $Li_2CoSiO_4$ can be used as a positive-electrode material for high-capacity batteries while securing the safety, because $Li_2MnSiO_4$ has a theoretical capacity that is 333.2 mAh/g and the theoretical capacity of $Li_2CoSiO_4$ is 325.1 mAh/g, and because not only either of their values are high but also they are less likely to release oxygen at the time of high temperatures.

RELATED TECHNICAL LITERATURE

Patent Literature

Patent Literature No. 1: Japanese Unexamined Patent Publication (KOKAI) Gazette No. 2008-218303 (Paragraphs "0025," and "0028");

Patent Literature No. 2: Japanese Unexamined Patent Publication (KOKAI) Gazette No. 2009-170401 (Paragraph "0010"); and Patent Literature No. 3: Japanese Unexamined Patent Publication (KOKAI) Gazette No. 2001-266882 (Paragraph "0017")

SUMMARY OF THE INVENTION

Assignments to be Solved by the Invention

However, although those polyanion-based compounds have high theoretical capacities, battery capacities, which can be extracted from them actually, are low because their electron conductivities are low. Consequently, a miniaturization treatment for particles, or a conductivity impartation treatment becomes necessary. In addition, as to batteries in which $Li_2MnSiO_4$ is used, the resulting discharge average voltage is as low as about 2.88 V. Meanwhile, as to batteries in which $Li_2CoSiO_4$ is used, there arises such an assignment that the resultant battery capacities are low, although the resulting discharge voltages are high.

The present invention is one which has been done in view of such circumstances. It is an object to provide the following: a lithium silicate-based compound that can be used as a novel positive-electrode active material whose discharge voltages are higher, and a production process for the same; a positive-electrode active material and positive electrode for use in secondary battery; as well as a secondary battery.

Means for Solving the Assignments (1) A lithium silicate-based compound according to the present invention is characterized in that:

the lithium silicate-based compound is expressed by a general formula, $Li_{(2-a+b)}A_aMn_{(1-x-y)}Co_xM_ySiO_{(4+\alpha)}Cl_\beta$ (In the formula: "A" is at least one element selected from the group consisting of Na, K, Rb and Cs; "M" is at least one member selected from the group consisting of Mg, Ca, Al, Ni, Fe, Nb, Ti, Cr, Cu, Zn, Zr, V, Mo and W; and the respective subscripts appear to be as follows: $0 \le "a" < 0.2$; $0 \le "b" < 1$; $0 < "x" < 1$; $0 \le "y" \le 0.5$; $(1-"x"-"y") > 0$; $-0.25 \le "\alpha" \le 1.25$; and $0 \le "\beta" \le 0.05$).

(2) A production process for lithium silicate-based compound according to the present invention is characterized in that:

the process comprises a reaction step in which a lithium-silicate compound expressed by $Li_2SiO_3$ and a metallic element-containing substance including cobalt (Co) and manganese (Mn) are caused to react one another within a molten salt including at least one member selected from the group consisting of alkali metal salts.

(3) A positive-electrode active material for secondary battery according to the present invention is characterized in that:

the positive-electrode active material comprises the above-mentioned lithium silicate-based compound, and is able to sorb and desorb lithium ions.

(4) A positive electrode for secondary battery according to the present invention is characterized in that:

the positive electrode comprises the above-mentioned positive-electrode active material.

(5) A secondary battery according to the present invention is characterized in that:

the secondary battery comprises the above-mentioned positive electrode as a constituent element.

Effect of the Invention

The lithium silicate-based compound according to the present invention comprises a noble lithium-manganese-cobalt silicate whose discharge voltages are higher. Consequently, in accordance with the lithium silicate-based compound according to the present invention, it is possible to provide secondary batteries whose discharge voltages are higher, as well as positive-electrode active materials and positive electrodes that are used for the same.

MODES FOR CARRYING OUT THE INVENTION

Lithium Silicate-Based Compound

A lithium silicate-based compound according to the present invention is expressed by a general formula, $Li_{(2-a+b)}A_aMn_{(1-x-y)}Co_xM_ySiO_{(4+\alpha)}Cl_\beta$ (In the formula: "A" is at least one element selected from the group consisting of Na, K, Rb and Cs; "M" is at least one member selected from the group consisting of Mg, Ca, Al, Ni, Fe, Nb, Ti, Cr, Cu, Zn, Zr, V, Mo and W; and the respective subscripts appear to be as follows: 0≤"a"<0.2; 0≤"b"<1; 0<"x"<1; 0≤"y"≤0.5; (1−"x"−"y")>0; −0.25≤"α"≤1.25; and 0≤"β"≤0.05).

The lithium silicate-based compound includes Li, one of the alkali metal elements, as an essential component, and can also include an element "A," an alkali metal element other than Li. The alkali metal element "A" other than Li is at least one member that is selected from the group consisting of Na (sodium), K (potassium), Rb (rubidium), and Cs (cesium).

In the lithium silicate-based compound, a ratio "a" of the number of moles of the alkali metal element "A" other than Li is from 0 or more to less than 0.2 with respect to the number of moles of Si (silicon). When the ratio "a" is 0.2 or more, the resulting lithium silicate-based compound becomes less likely to be used in a positive-electrode active material for secondary battery that is able to sorb and desorb lithium ions. It is preferable that the ratio "a" can be from 0 or more to 0.1 or less, or can furthermore be from 0 or more to 0.05 or less. When the ratio "a" is 0 (zero), that is, when a lithium element alone is used as the alkali metal element, compounds are obtainable in which the element "A" is not included, and which are expressed by a general formula, $Li_{(2+b)}Mn_{(1-x-y)}Co_xM_ySiO_{(4+\alpha)}Cl_\beta$.

When the lithium silicate-based compound is produced by a later-described molten salt-method, the content of lithium included in the produced lithium silicate-based compound tends to be more, because of the fact that lithium within a molten salt might sometimes be possibly taken in into crystals.

It is preferable that the lithium silicate-based compound can comprise a solid solution of $Li_2MnSiO_4$ and $Li_2CoSiO_4$. The lithium silicate-based compound is one of lithium-manganese-cobalt-based silicates that comprise lithium (Li), and transition metal elements including Mn (manganese) and cobalt (Co), as the essential constituent components. In the lithium silicate-based compound, polyanions of silicon element (Si), whose electronegativity is greater, are disposed around the Mn and Co. When this lithium silicate-based compound is used as a positive-electrode active material for lithium secondary battery, the Mn and Co undergo oxidations and reductions so that their valences change. As being accompanied therewith, the movements of lithium ions occur by means of the electroneutrality principle, so that the capacities of lithium-ion secondary battery are demonstrated. Because of the fact that the lithium silicate-based compound has higher discharge voltages, it is possible to use it as a positive-electrode active material for lithium secondary battery.

In the lithium silicate-based compound, Co is a substitution element that is introduced into the Mn sites. When the introduction amount of Co is made more, the resulting capacities tend to decline, although the resultant discharge voltages become higher.

In the lithium silicate-based compound, a ratio "x" of the number of moles of the Co falls within a range of 0<"x"<1 with respect to the number of moles of Si. When the ratio "x" is 0, there might possibly arise such a fear that the resulting discharge capacities have declined, because no Co is included in the lithium silicate-based compound. When the ratio "x" is 1, there might possibly arise such another fear that the resultant discharge capacities have declined.

In the lithium silicate-based compound, it is preferable that the ratio "x" of the number of moles of Co can fall within a range of 0<"x"≤0.5 with respect to the number of moles of Si. In this instance, not only the resulting discharge voltages are higher, but also it is possible to keep the resultant batteries' capacities larger as well.

According to an X-ray diffraction (or XRD) analysis, since the resulting XRD pattern's respective peak positions shift toward higher angle sides when the introduction amount of Co increases with respect to the Mn in $Li_2MnSiO_4$ and accordingly the XRD pattern tends to approach the pattern of $Li_2CoSiO_4$, it is possible to tell whether Co makes a solid solution or not by means of XRD.

Although the lithium silicate-based compound includes Mn and Co as the essential elements, it can further include another metallic element as well. The other metallic element can appear as "M" in the general formula. The other metallic element "M" is at least one member that is selected from the group consisting of magnesium (Mg), calcium (Ca), Al (aluminum), Ni (nickel), Fe (iron), Nb (niobium), Ti (titanium), Cr (chromium), Cu (copper), Zn (zinc), Zr (zirconium), V (vanadium), Mo (molybdenum), and W (tungsten).

It is possible for the other metallic element "M" to come in into a part of the Mn sites along with Co. In the lithium silicate-based compound, a ratio "y" of the number of moles of the other metallic element "M" falls within a range of 0≤"y"≤0.5 with respect to the number of moles of Si. When the ratio "y" exceeds 0.5, influences, which the Mn and Co give to the resulting positive-electrode active material's electric characteristics, have become lower than those which the other metallic element "M" gives. Preferably, the ratio "y" can be from 0 or more to 0.4 or less, or can furthermore be from 0 or more to 0.1 or less. The ratio "y" can even be 0.

Since Co, or Co and the other metallic element "M" come in into apart of the Mn sites, a ratio of the number of moles of Mn can be expressed as (1–"x"–"y") with respect to the numbers of moles of Si. In the silicate-based compound according to the present invention, the ratio, (1–"x"–"y"), is more than 0, because Mn is the essential element.

In the lithium silicate-based compound, silicate is included. The silicate includes polyanions of silicon element (Si) whose electronegativity is larger, and is disposed around the Mn and Co inside the crystal structure. In the lithium silicate-based compound, a ratio of the number of moles of oxygen (O) can be expressed as (4+"α") (e.g., –0.25≤"α"≤1.25) with respect to the number of moles of Si. When the ratio "α" is less than –0.25, there might possibly arise such a fear that the state of oxygen deficiency has become greater so that it becomes impossible to maintain the crystal structure. When the ratio "α" is so large to exceed 1.25, there might possibly arise such a fear that it has become impossible to maintain the crystal structure. In addition, being 1<"α"<1.25 is preferable. In this instance, it is possible to maintain the crystal structure effectively.

In the lithium silicate-based compound, some of a molten salt, which is used during the production process, can even be included. When an alkali metal chloride is used as the molten salt, the lithium silicate-based compound, which can be expressed by a general formula, $Li_{(2+b)}Mn_{(1-x-y)}Co_xM_ySiO_{(4+\alpha)}Cl_\beta$, is obtainable. In this case, the ratio "β" of the number of moles of chloride (Cl) can be 0≤"β"≤0.05 with respect to the number of moles of Si. When the ratio "β" exceeds 0.05, there might possibly arise such a fear that it has become impossible to maintain the crystal structure. In addition, being 0<"β"<0.01 is preferable. In this instance, it is possible to maintain the crystal structure effectively.

In the lithium silicate-based compound, inevitable impurities can even be included. The inevitable impurities might possibly be admixed accidentally in the raw materials, or during the production process, for instance. Moreover, as for the obtainable lithium silicate-based compound as a whole, it is allowable that the compositions shown in the general formula can make the basic composition, or it is even permissible that the resulting compositions can deviate slightly from the aforementioned general formula due to the deficiency of the metallic elements or oxygen that occurs inevitably.

It is allowable that the lithium silicate-based compound can have a crystalline structure that is orthorhombic crystal. It is preferable that the lithium silicate-based compound can exhibit a space group that is "Pmn21," or "Pmnb."

Production Process for Lithium Silicate-Based Compound

A production process for lithium silicate-based compound according to the present invention comprises a reaction step in which a lithium-silicate compound expressed by $Li_2SiO_3$ and a metallic compound including cobalt (Co) and manganese (Mn) are caused to react one another within a molten salt including at least one member that is selected from the group consisting of alkali metal salts. In the reaction step, a molten salt can be used which includes at least one member that is selected from the group consisting of alkali metal salts.

Composition of Molten Salt

In the production process for lithium silicate-based compound according to the present invention, a synthesis reaction for lithium silicate-based compound is carried out within the molten salt including at least one member that is selected from the group consisting of alkali metal salts.

As the alkali metal salts, at least one member can be given which is selected from the group consisting of lithium salts, potassium salts, sodium salts, rubidium salts, and cesium salts. Even among them, being desirable is the lithium salts. When employing the molten salt that includes a lithium salt, the lithium silicate-based compound, in which the formation of impurity phases is less and which includes lithium atoms excessively, is likely to be formed. The lithium silicate-based compound, which is obtainable in this manner, makes a positive-electrode material for lithium secondary battery that exhibits better cyclability and higher capacities.

Moreover, it is desirable that the alkali metal salts can include at least one member that is selected from the group consisting of alkali metal chlorides, alkali metal carbonates, alkali metal nitrates, and alkali metal hydroxides. To be concrete, the following can be given: lithium chloride (LiCl), sodium chloride (NaCl), potassium chloride (KCl), rubidium chloride (RbCl), cesium chloride (CsCl), lithium carbonate ($Li_2CO_3$), potassium carbonate ($K_2CO_3$), sodium carbonate ($Na_2CO_3$), rubidium carbonate ($Rb_2CO_3$), cesium carbonate ($Cs_2CO_3$), lithium nitrate ($LiNO_3$), potassium nitrate ($KNO_3$), sodium nitrate ($NaNO_3$), rubidium nitrate ($RbNO_3$), cesium nitrate ($CsNO_3$), lithium hydroxide (LiOH), potassium hydroxide (KOH), sodium hydroxide (NaOH), rubidium hydroxide (RbOH), and cesium hydroxide (CsOH). It is allowable to employ one member of these independently, or to mix two or more members of them one another to employ.

Even among the above, it is preferable that the alkali metal salts can include alkali metal chlorides. In particular, when the alkali metal chlorides include lithium chloride, it is possible to generate the lithium silicate-based compound whose purity is higher.

Moreover, it is preferable that the molten salt can be a mixed molten salt that is made by mixing multiple members of alkali metal chlorides one another. For example, although lithium chloride independently exhibits a melting point of about 610° C., it is possible to make the resulting melting point 400° C. or less when making a mixture of lithium chloride and the other alkali metal salt into the molten salt, and thereby it becomes feasible to synthesize the targeted lithium silicate-based compound at such relatively lower temperatures as from 300 to 600° C. As a result, grain growths can be inhibited at the time of the synthesis reaction so that the lithium silicate-based compound being finer can be formed.

As far as the molten salt is selected from the above-mentioned alkali metal salts so as to make the resulting melting point 600° C. or less and is mixed with another alkali metal salt to use, a mixed molten salt can be obtained as the molten salt by adjusting the mixing ratio so as to make the resultant mixture's melting point 600° C. or less. Since the mixing ratio differs in compliance with the types of salts, it is difficult to prescribe it in general. The mixing ratio can be set up suitably in compliance with the types of salts.

For example, when a mixed chloride including lithium chloride indispensably and further including another chloride is employed as the molten salt, it is usually preferable to include the lithium chloride in an amount of 30% by mol or more, furthermore, in an amount from 30 to 70% by mol, when the entire mixed chloride is taken as 100% by mol. As a specific example of the mixed chloride, a mixture can be given which comprises lithium chloride in an amount of from 30 to 70% by mol, and potassium chloride in an amount of from 70 to 30% by mol. As a more preferable specific example of such a mixed chloride, a mixture can be given which comprises lithium chloride in an amount of from 40 to 70% by mol, and potassium chloride in an amount of form 30 to 60% by mol.

Note that, since the melting point of alkali metal nitrate and alkali metal hydroxide is 450° C. (e.g., that of lithium hydroxide) at the highest, it is possible to materialize a lower reaction temperature even with the molten salt that includes at least one member of nitrates and hydroxides independently.

Raw-Material Compound

In the present invention, as a raw-material compound that supplies Li, Mn and Co, a lithium-silicate compound, which is expressed by $Li_2SiO_3$, and a metallic element-containing substance, which includes Mn and Co, are used.

When a summed amount of metallic elements that are included in said metallic element-containing substance is taken as 100% by mol, it is preferable that the metallic element-containing substance includes at least one member of transition metal elements that is selected from the group consisting of Mn and Co in an amount of from 50% by mol or more to 100% by mol or less, and at least one member of metallic elements that is selected from the group consisting of Mg, Ca, Co, Al, Ni, Fe, Nb, Ti, Cr, Cu, Zn, Zr, V, Mo and W in an amount of from 0% by mol or more to 50% by mol or less. In a case where the amounts of the transition metal element and metallic element fall within the aforementioned ranges, it is possible to produce the lithium silicate-based compound according to the present invention.

Said metallic element-containing substance includes a deposit that is formed by alkalifying a compound aqueous solution comprising an Mn compound including manganese, and a Co compound including cobalt. A specific formation method for the deposit will be explained below.

As for the Mn compound and Co compound, it is possible to employ any components without any particular limitation, as far as they can form metallic element-containing aqueous solutions (hereinafter might sometimes be set forth as "solutions" whenever appropriate) including these compounds. Usually, water-soluble compounds can be used. As for specific examples of such a water-soluble compound, it is possible to give chlorides, water-soluble salts, such as, nitrates, sulfates, oxalates and acetates, or hydroxides, and the like. These water-soluble compounds can also be any one of anhydrides and hydrates. Moreover, even being water-insoluble compounds like metallic oxides and metallic hydroxides, and so forth, it is feasible to cause them to dissolve using an acid, such as hydrochloric acid and nitric acid, for instance, to use them as an aqueous solution. Each of the Mn compound and Co compound can also be employed independently for the respective metallic sources, or two or more members of them can even be used combinedly.

The metallic element-containing aqueous solution includes Mn and Co as the metallic sources indispensably, and can further include another metal as well. As to the metals' valence, it is preferable that, from the viewpoint of obtaining the deposit in which the metallic elements exist with divalence or less, they can exist with divalence or less in the aqueous solution as well.

It is preferable that said Mn compound can include at least one member of the following: manganese (II) chloride, manganese (II) nitrate, manganese (II) sulfate, manganese (II) acetate, manganese (III) acetate, manganese (II) acetylacetonate, potassium permanganate (VI), manganese (III) acetylacetonate, and hydrates of these.

It is preferable that said Co compound can include at least one member of the following: cobalt (II) chloride, cobalt (II) sulfate, cobalt (II) oxalate, cobalt (II) acetate, cobalt (II) nitrate, cobalt (III) chloride, cobalt (III) nitrate, and hydrates of these.

In order to obtain the deposit that includes two kinds of metallic elements, namely, Mn and Co, it is allowable to set the mixing proportions of the Mn compound and Co compound in the aqueous solution at the same elemental ratios as the elemental ratios of the respective metallic elements in the lithium silicate-based compound that is targeted.

With regard to the concentrations of the Mn compound and Co compound within the aqueous solution, they are not restrictive especially at all, so that they can be determined suitably so as to make it possible to form the aqueous solution that is uniform, and so as to make it possible to form the deposit smoothly. Usually, it is allowable to set a summed concentration of the Mn compound and Co compound at from 0.01 to 5 mol/L, furthermore, at from 0.1 to 2 mol/L, with respect to one liter of the aqueous solution.

The metallic element-containing aqueous solution can also include an alcohol. In other words, it is also allowable to use a water-alcohol mixed solvent, which includes a water-soluble alcohol, such as methanol and ethanol, in addition to using water independently as the solvent. Using a water-alcohol mixed solvent results in making it feasible to generate the deposit at temperatures that fall below 0° C. Although an employment amount of the alcohol can be determined suitably in compliance with the temperature of formation of the deposit that is targeted, it is usually appropriate to set at such an employment amount of 50 parts by mass or less with respect to water taken as 100 parts by mass. Note that, in the present description, the case of including an alcohol is also referred to as the "aqueous solution."

Subsequently, the deposit (or it can also be a coprecipitate) is caused to generate from the aqueous solution. In order to cause the precipitate to generate, the aqueous can be alkalified. Since conditions under which the deposit being favorable forms differ depending on the types or concentrations of the respective compounds included in the aqueous solution, it is not possible to prescribe them in general. However, it is usually preferable to set the pH at 8 or more, and it is more preferable to set the pH at 11 or more.

As to a method of alkalifying the metallic element-containing aqueous solution, it is not limited especially at all, but it is usually allowable to add an alkali, or an aqueous solution that includes an alkali, to the metallic element-containing aqueous solution. Moreover, it is possible to form the deposit even by such a method as adding the metallic element-containing aqueous solution to an aqueous solution that includes an alkali.

As for the alkali used for alkalifying the aqueous solution, it is possible to use alkali metal hydroxides, such as potassium hydroxide, sodium hydroxide and lithium hydroxide, or ammonia, for instance. The lithium hydroxide is especially preferable. That is, it is allowable that the deposit can be formed by dropping a lithium hydroxide aqueous solution to said compound aqueous solution.

Lithium hydroxide makes it possible to adjust the aqueous solution's pH readily. When using the above alkalis as an aqueous solution, it is possible to use them as an aqueous solution whose concentration is from 0.1 to 20 mol/L, or from 0.3 to 10 mol/L preferably.

Moreover, the alkalis can even be dissolved in a water-alcohol mixed solvent, which includes a water-soluble alcohol, in the same manner as done in the aqueous solutions of the metallic compounds that have been mentioned above.

As to a temperature of the aqueous solution, it is not limited especially at all. Although the deposit can be caused to generate at room temperature (e.g., from 20 to 35° C.), it is also allowable to set the aqueous solution's temperature at from −50° C. to +15° C., or at from −40° C. to +10° C. approximately, preferably. Retaining the aqueous solution at a low temperature leads not only to making the deposit finer but also to inhibiting the formation of impurity phases (the spinel phase, for instance) that is accompanied by the generation of neutralization heat at the time of reactions so that it becomes likely to cause the deposit being homogeneous to generate.

After alkalifying the aqueous solution, it is preferable to further carry out an oxidizing and/or aging treatment for the deposit while blowing air into the reacted solution at from 0 to 150° C., or at from 10 to 100° C. preferably, for over a period of from a half day to seven days, or from one to four days preferably. Note that it is also allowable that the oxidizing and/or aging treatment can be carried out even at room temperature.

It is possible to refine the deposit by means of washing the obtained deposit with distilled water, and the like, and then filtering out excessive alkali components, residual raw materials, and so forth, to remove them.

Although the obtained deposit contains Mn and Co as the essential elements, it is preferable for the Mn and Co to have such a valence as from divalent to tetravalent. Moreover, it is also allowable that the deposit can further include another metallic element, if needed. As for the other metallic element, it is possible to exemplify at least one member that is selected from the group consisting of Mg, Ca, Co, Al, Ni, Fe, Nb, Ti, Cr, Cu, Zn, Zr, V, Mo, and W.

As to mixing proportions of the lithium-silicate compound expressed by $Li_2SiO_3$ and the metallic element-containing substance, it is usually preferable to set a summed amount of metallic elements included in the metallic element-containing substance at such an amount that makes from 0.9 to 1.2 moles with respect to one mole of the lithium-silicate compound, or it is more preferable to set the summed amount at such an amount that makes from 0.95 to 1.1 moles.

Reaction Step

In the production process for lithium silicate-based compound according to the present invention, a reaction step is carried out in which said lithium-silicate compound and said metallic element-containing substance are caused to react one another within said molten salt.

Although it is not restrictive especially at all as to a specific reacting method, it is usually allowable to fuse a molten-salt raw material by heating it to the molten-salt raw material's melting point or more after mixing the molten-salt raw material, which includes at least one member selected from the group consisting of alkali metal salts that have been mentioned above, said lithium-silicate compound and said metallic element-containing substance one other, and then mixing them uniformly with use of a ball mill, and the like. Thus, reactions proceed between lithium, silicon and transition metals, and furthermore the other added metal, within the molten salt, so that it is possible to obtain the lithium silicate-based compound that is targeted.

On this occasion, it is not restrictive especially at all as to mixing proportions of the lithium-silicate compound and the metallic element-containing substance, as well as the molten-salt raw material. However, it is allowable that the constituent elements can be present in such an amount, respectively, which enables raw materials to disperse uniformly within the molten salt. For example, it is preferable that a summed amount of molten-salt raw materials can make an amount that falls in a range of from 20 to 300 parts by mass, or it is more preferable that the summed amount can make an amount that falls in a range of from 50 to 200 parts by mass, or furthermore from 60 to 80 parts by mass, with respect to a summed amount of the lithium-silicate compound and metallic element-containing substance that is taken as 100 parts by mass.

It is allowable that a temperature of the reaction between the lithium-silicate compound and the metallic element-containing substance within the resulting molten salt can be from 300° C. or more to 700° C. or less. Furthermore, it is permissible that the temperature can be from 400 to 700° C. Being less than 300° C. is not practical, because oxide ions (e.g., $O^{2-}$) are less likely to be released into the resultant molten salt, and because it takes a long period of time until the lithium silicate-based compound is synthesized. Moreover, going beyond 700° C. is not preferable, because the particles of the lithium silicate-based compound that is obtainable become likely to coarsen and thereby the reactions of lithium are less likely to proceed inside the particles when making the resulting lithium silicate-based compound into batteries. In particular, when a mixed chloride is used as the molten salt, it is advisable to carry out the reaction at from 500 to 700° C. In this instance, a yield of the lithium silicate-based compound heightens within the resultant product.

The reaction, which has been mentioned above, can be carried out under a nitrogen-gas atmosphere, or under a mixed-gas atmosphere including carbon dioxide and a reducing gas, in order to let metallic elements, such as Mn and Co, included in the metallic element-containing substance, exist stably as divalent ions within the resulting molten salt. Under the atmosphere, it becomes feasible to stably maintain the metallic elements in the divalent state even when they are metallic elements whose before-reaction oxidation number is other than being divalent.

The above-mentioned reaction can be carried out under a mixed-gas atmosphere including carbon dioxide and a reducing gas. When carrying out the reaction under the mixed-gas atmosphere, although there are not any limitations at all especially as to a ratio between carbon dioxide and a reducing gas, using the reducing gas facilitates the decomposition of molten-salt raw materials more so that the reaction rate becomes faster, because the carbon dioxide controlling the oxidizing atmosphere decreases. However, when the reducing gas is present excessively, divalent metallic elements in the resultant lithium silicate-based compound are reduced by means of the resulting reducing property that is too high, and there might possibly arise such a case where reaction products are not obtainable with higher purity. Accordingly, it is preferable to set a favorable mixing rate in the mixed gas so that the reducing gas makes from 1 to 40, or furthermore from 3 to 20, with respect to the carbon dioxide taken as 100, by volumetric ratio. As for the reducing gas, it is possible to use hydrogen, carbon monoxide, and the like, for instance, and hydrogen is preferable especially.

As to a pressure of the mixed gas of carbon dioxide and a reducing gas, there are not any limitations at all especially. Although it is usually allowable to set the pressure at an atmospheric pressure, it is even permissible to put the mixed gas either in a pressurized condition, or in a depressurized condition.

It is usually allowable to set a time for the reaction between the lithium-silicate compound and the metallic element-containing substance at from 10 minutes to 70 hours. Preferably, it is permissible to set the time at from 5 to 25 hours, or furthermore at from 10 to 20 hours.

Following said reaction step, it is allowable to further include a removal step in which said alkali metal salt is removed by means of a solvent. The lithium silicate-based compound with higher purity is obtainable by means of cooling and then removing the alkali metal salt, which has been used as a flux, after completing the above-mentioned reaction. As for a method of removing the alkali metal salt, it is permissible to dissolve and then remove the alkali metal salt by means of washing products with use of a solvent that is capable of dissolving the alkali metal salt that has been solidified by means of the post-reaction cooling. For example, it is advisable to use water as the solvent.

Carbon-Coating Treatment

In the lithium silicate-based compound that is obtainable by the process having been mentioned above, and which is expressed by the compositional formula: $Li_{(2-a+b)}A_a Mn_{(1-x-y)}Co_xM_ySiO_{(4+\alpha)}Cl_\beta$ it is also allowable to further carry out a coating treatment by means of carbon in order to cause the conductivity to upgrade.

As to a specific method of the carbon-coating treatment, it is not restrictive especially at all. In addition to a gas-phase method in which heat treatment is carried out in an atmosphere including a carbon-containing gas, like methane gas, ethane gas, butane gas, and so on, it is feasible to apply to the method a thermal decomposition method as well in which an organic substance making a carbonaceous source is carbonized by means of heat treatment after mixing the organic substance with the lithium silicate-based compound uniformly. In particular, it is preferable to apply to the method a ball-milling method in which a heat treatment is carried out after adding a carbonaceous material and $Li_2CO_3$ to the aforementioned lithium silicate-based compound and then mixing them uniformly by means of ball milling until the resulting lithium silicate-based compound turns into being amorphous. In accordance with this method, the lithium silicate-based compound serving as a positive-electrode active material is turned into being amorphous by means of ball milling, and is thereby mixed uniformly with carbon so that the adhesiveness increases. In addition, it is possible to do coating, because carbon precipitates uniformly around the resultant lithium silicate-based compound by means of the heat treatment, simultaneously with the recrystallization of the aforesaid lithium silicate-based compound. On this occasion, due to the fact that $Li_2CO_3$ exists, the resulting lithium-rich silicate-based compound does not at all turn into being deficient in lithium, but becomes one which shows higher charging and discharging capacities.

As to an extent of turning into being amorphous, it is allowable that a ratio, $B\,(011)_{crystal}/B\,(011)_{mill}$, can fall in a range of from 0.1 to 0.5 approximately when labeling $B\,(011)_{crystal}$ a half-value width of the diffraction peak, which is derived from the (011) plane and which is equivalent to a peak whose $2\theta$ is present at around 24 to 25 degrees, regarding a sample having crystallinity before undergoing ball milling, and labeling $B\,(011)_{mill}$ another half-value width of the diffraction peak, which is derived from the (011) plane of the sample obtained by means of ball milling, in an X-ray diffraction measurement in which the CuKα ray serves as the light source.

In the method, it is possible to use acetylene black (or AB), KETJENBLACK (or KB), graphite, and the like, as for the carbonaceous material.

As to a mixing proportion between the lithium silicate-based compound, a carbonaceous material and $Li_2CO_3$, it is allowable to set the mixing proportion at from 20 to 40 parts by mass for the carbonaceous material and to set the mixing proportion at from 20 to 40 parts by mass for $Li_2CO_3$, respectively, with respect to the lithium silicate-based compound taken as 100 parts by mass.

The heat treatment is carried out after carrying out a ball-milling treatment until the lithium silicate-based compound turns into being amorphous. The heat treatment can be carried out under a reducing atmosphere in order to retain transition metal ions included in the resulting lithium silicate-based compound at divalence. As for the reducing atmosphere in this case, it is preferable to be within a mixed-gas atmosphere of carbon dioxide and a reducing gas in order to inhibit the divalent transition metal ions from being reduced to the metallic states, in the same manner as the synthesis reaction of the lithium silicate-based compound within the molten salt. It is allowable to set a mixing proportion of carbon dioxide and that of a reducing gas similarly to those at the time of the synthesis reaction of the lithium silicate-based compound.

It is preferable to set a temperature of the heat treatment at from 500 to 800° C. When the heat-treatment temperature is too low, it is difficult to cause carbon to uniformly precipitate around the resulting lithium silicate-based compound. On the other hand, the heat-treatment temperature being too high is not preferable, because the decomposition or lithium deficiency might possibly occur in the resultant lithium silicate-based compound, so that the resulting charging and discharging capacities decline. Moreover, it is usually allowable to set a time for the heat treatment at from one to 10 hours.

Moreover, as another method of the carbon-coating treatment, it is also allowable to carry out the heat treatment after adding a carbonaceous material and LiF to the aforementioned lithium silicate-based compound and then mixing them uniformly by means of ball milling until the resulting lithium silicate-based compound turns into being amorphous in the same manner as the method that has been mentioned above. In this instance, simultaneously with the recrystallization of the lithium silicate-based compound, carbon precipitates uniformly around the aforesaid lithium silicate-based compound to coat it and then upgrade it in the conductivity, in the same manner as the case that has been mentioned above. In addition, fluorine atoms substitute for apart of oxygen atoms in the resultant lithium silicate-based compound. Thus, a fluorine-containing lithium silicate-based compound can be formed which is expressed by the following compositional formula.

Compositional Formula:

$$Li_{(2-a+b)}A_a Mn_{(1-x-y)}Co_x M_y SiO_{(4+\alpha-z)}Cl_\beta F_{2z}$$

In the formula, "A" is at least one element that is selected from the group consisting of Na, K, Rb, and Cs; "M" is at least one member that is selected from the group consisting of Mg, Ca, Al, Ni, Fe, Nb, Ti, Cr, Cu, Zn, Zr, V, Mo, and W; and the respective subscripts appear to be as follows: $0\leq"a"<0.2$; $0\leq"b"<1$; $0<"x"<1$; $0\leq"y"\leq 0.5$; $(1-"x"-"y")>0$; $-0.25\leq"\alpha"\leq 1.25$; $0\leq"\beta"\leq 0.05$; and $0<"z"<1$.

The compound makes a positive-electrode material that has much better performance, because the resulting average voltage is raised by means of added F when it is used as a positive electrode. On this occasion, the resultant lithium-rich lithium silicate-based compound makes one which shows higher charge and discharge capacities, because the lithium-rich lithium silicate-based compound does not turn into being poor in lithium at all, due to the fact that LiF exists.

In the method, as to a mixing proportion between the lithium silicate-based compound, a carbonaceous material and LiF, it is allowable to set the mixing proportion at from 20 to 40 parts by mass for the carbon-based material and to set the mixing proportion at from 10 to 40 parts by mass for LiF, respectively, with respect to the lithium silicate-based compound taken as 100 parts by mass. In addition, it is also permissible that $Li_2CO_3$ can be further included, if needed. As to conditions of the ball milling and heat treatment, it is advisable to set the conditions similarly to those in the case that has been mentioned above.

Positive Electrode for Secondary Battery

It is possible to effectively employ any one of the following as an active material for positive electrode for use in lithium secondary battery that is able to sorb and desorb lithium ions: the lithium silicate-based compound to which the carbon-coating treatment is carried out, and the lithium silicate-based compound to which fluorine is added, not to mention the lithium silicate-based compound that is obtainable by means of the production process according to the present invention. It is possible for a positive electrode using one of these lithium silicate-based compounds to have the same structure as that of an ordinary positive electrode for use in lithium secondary battery.

For example, it is possible to fabricate a positive electrode by means of adding a conductive additive, such as acetylene black (or AB), KETJENBLACK (or KB) or gas-phase method carbon fiber (e.g., vapor growth carbon fiber (or VGCF)), a binder, such as polyvinylidene fluoride (e.g., polyvinylidene difluoride (or PVdF)), polytetrafluoroethylene (or PTFE) or styrene-butadiene rubber (or SBR), and a solvent, such as N-methyl-2-pyrolidione (or NMP), to one of the aforementioned lithium silicate-based compounds, turning these into being pasty, and then coating the resulting pasty product onto a current collector. As to an employment amount of the conductive additive, although it is not restrictive especially at all, it is possible to set the employment amount at from 5 to 20 parts by mass with respect to the lithium silicate-based compound taken as 100 parts by mass, for instance. Moreover, as to an employment amount of the binder, although it is not restrictive especially at all, either, it is possible to set the employment amount at from 5 to 20 parts by mass with respect to the lithium silicate-based compound taken as 100 parts by mass, for instance. Moreover, as another method, a positive electrode can also be manufactured by means of such a method in which a mixture being made by mixing the lithium silicate-based compound with the above-mentioned conductive additive and binder is kneaded as a film shape with use of a mortar or pressing machine and then the resultant film-shaped product is press bonded onto a current collector by a pressing machine.

As for the current collector, there are not any limitations at all especially, and so it is possible to use materials that have been heretofore employed conventionally as positive electrodes for secondary battery, such as aluminum foils, aluminum meshes and stainless steel meshes, for instance. In addition, it is possible to employ, as the current collector, carbon nonwoven fabrics or carbon woven fabrics, and the like, as well.

In the positive electrode for lithium-ion secondary battery according to the present invention, it is not restrictive especially at all as to its configuration, thickness, and the like. However, it is preferable to set the thickness at from 10 to 200 μm, more preferably, at from 20 to 100 μm, for instance, by means of compressing the active material after filling it up. Therefore, it is allowable to suitably determine a fill-up amount of the active material so as to make the aforementioned thickness after being compressed, in compliance with the types, structures, and so forth, of current collectors to be employed.

Secondary Battery

It is possible to manufacture a secondary battery that uses the positive electrode for secondary battery, which has been mentioned above, by means of publicly-known methods. That is, secondary batteries can be assembled in accordance with the ordinary methods while employing the following as the positive-electrode material, the negative-electrode material and the electrolytic solution, respectively, and further employing the other publicly-known constituent elements for battery: the positive electrode having been mentioned above; publicly-known metallic lithium, a carbon-based material, such as graphite, a silicon-based material, such as silicon thin films, an alloy-based material, such as copper-tin and cobalt-tin, or an oxide material, such as lithium titanate; and a solution, in which a lithium salt, such as lithium perchlorate, $LiPF_6$, $LiBF_4$ or $LiCF_3SO_3$, has been caused to dissolve in a concentration of from 0.5 mol/L to 1.7 mol/L in a publicly-known nonaqueous system solvent, such as ethylene carbonate, dimethyl carbonate, propylene carbonate or dimethyl carbonate.

The case of using metallic lithium as the negative electrode results in making lithium secondary batteries, and the other case of using materials other than metallic lithium as the negative electrode results in making lithium-ion secondary batteries. In general, many of secondary batteries, in which the battery reactions are carried out by means of lithium ions, belong to the type of nonaqueous-electrolyte secondary battery.

It is allowable for vehicles to have a secondary battery, which uses the positive electrode for secondary battery that has been mentioned above, on-board, for instance. The vehicles can be electric vehicles or hybrid vehicles, and the like. The secondary battery, for example, can be connected to a motor for driving which the vehicles have on-board, so that it can be used as a driving source. In this instance, it is possible to cause higher driving torques to output for a longer period of time. Moreover, it is possible for products other than the vehicles as well, such as personal computers and portable communication devices, to have the secondary battery, which uses the positive electrode for secondary battery that has been mentioned above, on-board.

EXAMPLES

1. Investigation into Compositional Ratios

As shown below, in order to synthesize lithium silicate-based compounds that could be expressed by the general formula, $Li_{(2-a+b)}A_aMn_{(1-x)}Co_xM_ySiO_{(4+\alpha)}Cl_\beta$ (In the formula: "A" is at least one member selected from the group consisting of Na, K, Rb and Cs; and the respective subscripts appear to be as follows: $0 \leq "a" < 0.2$; $0 \leq "b" < 1$; $0 \leq "x" \leq 1$; $-0.25 \leq "\alpha" \leq 1.25$; and $0 \leq "\beta" 23\ 0.05$), Sample Nos. 1 through 5 were produced by the following production process. Sample No. 1 corresponded to a case where the Co introduction amount, "x," equaled to zero within the lithium silicate-based compound, Sample No. 2 corresponded to another case where "x"=0.1, Sample No. 3 corresponded to another case where "x"=0.5, Sample No. 4 corresponded to another case where "x"=0.7, and Sample No. 5 corresponded to another case where "x"=1.0. Sample Nos. 1 and 5 were reference examples relevant to the present invention, whereas Battery Nos. 2, 3 and 4 were embodiments according to the present invention.

Sample No. 1 (where "x"=0)

Synthesis of Manganese-Containing Deposit

A lithium hydroxide aqueous solution was made by dissolving 2.5-mol lithium hydroxide anhydride (LiOH) in 1,000-mL distilled water. Moreover, a manganese chloride aqueous solution was made by dissolving 0.25-mol manganese chloride tetrahydrate ($MnCl_2.4H_2O$) in 500-mL distilled water. The lithium hydroxide aqueous solution was dropped into the manganese chloride aqueous solution gradually at room temperature (e.g., about 20° C.) for over a few hours, thereby generating a manganese-based deposit. Thereafter, air was blown into the reaction liquid including the deposit while stirring it, thereby subjecting it to a bubbling treatment at room temperature for one day. After filtering the obtained manganese-based deposit, it was then filter washed with distilled water about three times. The washed manganese-based deposit was dried at 40° C. for one night.

As a result of analyzing the thus obtained manganese-based deposit using X-ray diffraction, it was found to be a compound that was expressed by a compositional formula: MnOOH. In other words, Mn was included in an amount of 1 mole in 1 mole of the deposit. Moreover, it was ascertained that the obtained deposit was porous by means of a scanning electron microscope (or SEM).

Synthesis of Manganese-Containing Lithium Silicate-Based Compound

A carbonate mixture was prepared by mixing lithium carbonate (produced by KISHIDA KAGAKU Co. Ltd., and with 99.9% purity), sodium carbonate (produced by KISHIDA KAGAKU Co. Ltd., and with 99.5% purity) and potassium carbonate (produced by KISHIDA KAGAKU Co. Ltd., and with 99.5% purity) one another in a rate of 43.5:31.5:25 by molar ratio. This carbonate mixture, 0.03 moles of the above-mentioned manganese-based deposit, and 0.03 moles of lithium silicate (e.g., $Li_2SiO_3$ (produced by KISHIDA KAGAKU Co. Ltd., and with 99.5% purity)) were mixed one another so as to let a summed amount of the manganese-based deposit and lithium silicate make a proportion of 160 parts by mass with respect to the carbonate mixture taken as 100 parts by mass. After adding 20-mL acetone to the resulting mixture, the mixture was further mixed by a ball mill made of zirconia at a rate of 500 rpm for 60 minutes, and was then dried.

The post-drying mixed powder was heated within a golden crucible, and was then further heated to 500° C. under a mixed-gas atmosphere of carbon dioxide (e.g., 100-mL/min flow volume) and hydrogen (e.g., 3-mL/min flow volume), thereby causing the mixed powder to react for 13 hours in a state where the carbonate mixture was fused.

After the reaction, the entirety of a reactor core including the golden crucible, namely, the reaction system, was taken from out of an electric furnace, and was then cooled rapidly down to room temperature while keeping letting the mixed gas pass through.

Subsequently, the resulting solidified reaction product was grounded with a pestle and mortar after adding water (e.g., 20 mL) to the reaction product. Then, the thus obtained powder was filtered in order to remove salts, and the like, from it after the powder had been caused to dissolve in water, thereby obtaining a powder of manganese-containing lithium silicate-based compound.

Figure 1:
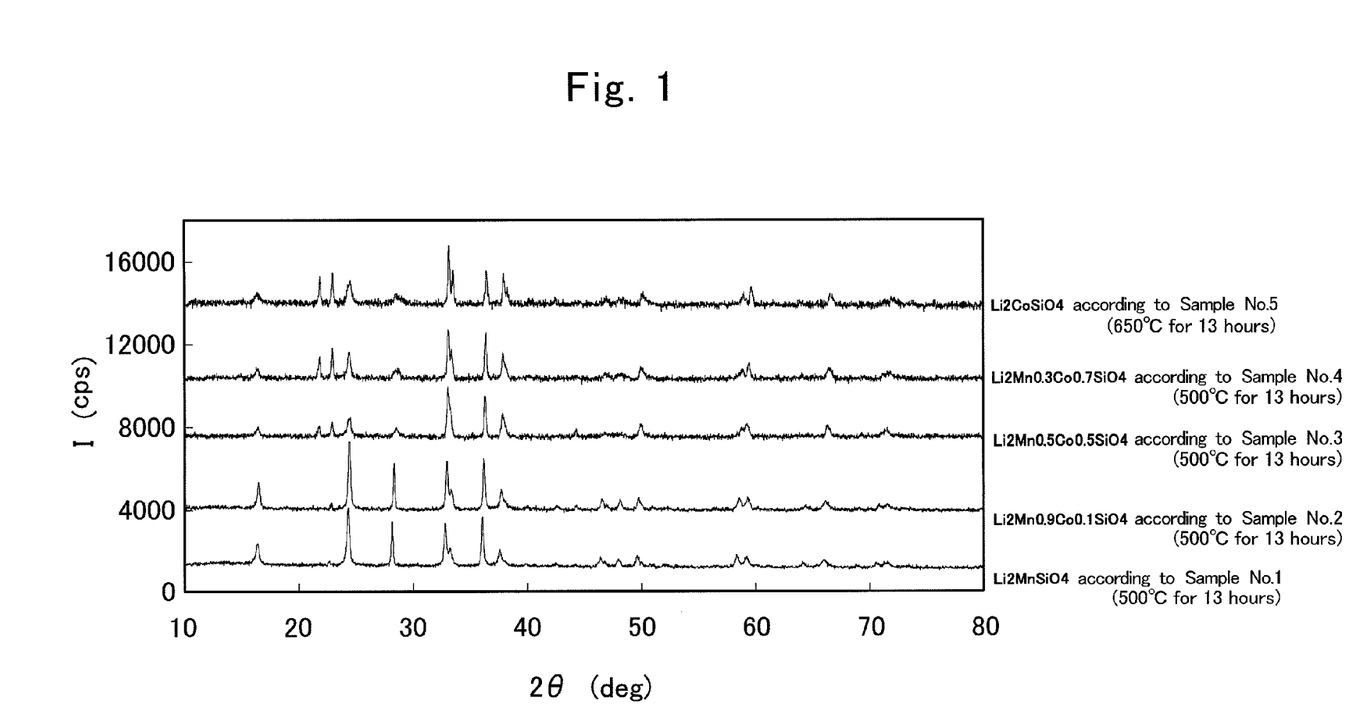
FIG. 1 shows X-ray diffraction patterns of compounds obtained by means of production processes according to Sample Nos. 1 through 5.
Figure 3:
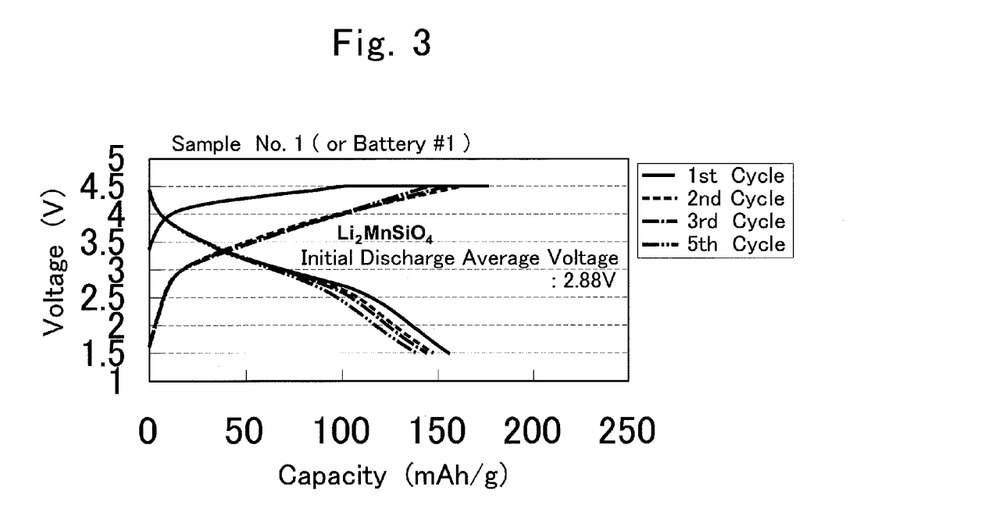
FIG. 3 shows charging and discharging curves of a lithium secondary battery in which the compound obtained by means of the production process according to Sample No. 1 was used as a positive-electrode active material.

For the thus obtained powder, an X-ray diffraction (or XRD) measurement was carried out with use of the $CuK\alpha$ ray whose wavelength was 1.54 Å by means of a powder X-ray diffraction apparatus. The resulting XRD pattern is shown in FIG. 1 and FIG. 3. This XRD pattern agreed with the reported pattern of orthorhombic-crystal $Li_2MnSiO_4$ in the space group "Pmn21" virtually.

The thus obtained aforementioned manganese-containing lithium silicate-based compound, and acetylene black making a carbon source were mixed one another in a rate of 5:4 by mass ratio. Ball milling was used for the mixing, and the mixing conditions were as follows: 450 rpm; and five hours. Thereafter, Sample No. 1 was obtained by means of carrying out a heat treatment at 700° C. for 2 hours under such a gas flow volume as $CO_2:H_2=100:3$ by $cm^3$ with use of a heat-treatment furnace that could control its atmosphere.

Sample No. 2 (where "x"=0.1)

Synthesis of Manganese-Cobalt-Based Deposit

A lithium hydroxide aqueous solution was made by dissolving 2.5-mol lithium hydroxide anhydride (LiOH) in 1,000-mL distilled water. Moreover, a manganese chloride aqueous solution was made by dissolving 0.225-mol manganese chloride tetrahydrate ($MnCl_2.4H_2O$) in 500-mL distilled water. A manganese-cobalt mixed aqueous solution was made by dissolving 0.025-mol cobalt nitrate hydrate ($Co(NO_3)_2.6H_2O$) in the aforementioned manganese chloride aqueous solution. The aforementioned lithium hydroxide aqueous solution was dropped into the resulting mixed aqueous solution gradually at room temperature (e.g., about 20° C.) for over a few hours, thereby generating a manganese-cobalt-based deposit. Thereafter, air was blown into the reaction liquid including the deposit while stirring it, thereby subjecting it to a bubbling treatment at room temperature for one day. After filtering the obtained manganese-cobalt-based deposit, it was then filter washed with distilled water about three times. The washed manganese-cobalt-based deposit was dried at 40° C. for one night.

Synthesis of Manganese-Cobalt-Containing Lithium Silicate-Based Compound

A mixed chloride (e.g., $(Li_{0.585}K_{0.415})Cl$) was prepared by melting lithium chloride (LiCl (produced by KISHIDA KAGAKU Co. Ltd., and with 99.0% purity)) and potassium chloride (KCl (produced by KISHIDA KAGAKU Co. Ltd., and with 99.5% purity)) at 400° C. in an $N_2$ atmosphere and then pulverizing them after weighing them out in a predetermined amount, respectively, and mixing them one another.

The resulting mixed chloride, 0.03 moles of the above-mentioned manganese-cobalt-based deposit, and 0.03 moles of lithium silicate (e.g., $Li_2SiO_3$ (produced by KISHIDA KAGAKU Co. Ltd., and with 99.5% purity)) were mixed one another so as to let a summed amount of the manganese-cobalt-based deposit and lithium silicate make a proportion of 160 parts by mass with respect to the mixed chloride taken as 100 parts by mass. After adding 20-mL acetone to the resultant mixture, the mixture was further mixed by a ball mill made of zirconia at a rate of 500 rpm for 60 minutes, and was then dried.

The post-drying mixed powder was heated within a golden crucible, and was then further heated to 500° C. under a mixed-gas atmosphere of carbon dioxide (e.g., 100-mL/min flow volume) and hydrogen (e.g., 3-mL/min flow volume), thereby causing the mixed powder to react for 13 hours in a state where the mixed chloride was fused. After the reaction, the entirety of a reactor core including the golden crucible, namely, the reaction system, was taken from out of an electric furnace, and was then cooled rapidly down to room temperature while keeping letting the mixed gas pass through. Subsequently, the resulting solidified reaction product was grounded with a pestle and mortar after adding water (e.g., 20 mL) to the reaction product. Then, the thus obtained powder was filtered in order to remove salts, and the like, from it after the powder had been caused to dissolve in water, thereby obtaining a powder of manganese-cobalt-containing lithium silicate-based compound.

Figure 2:
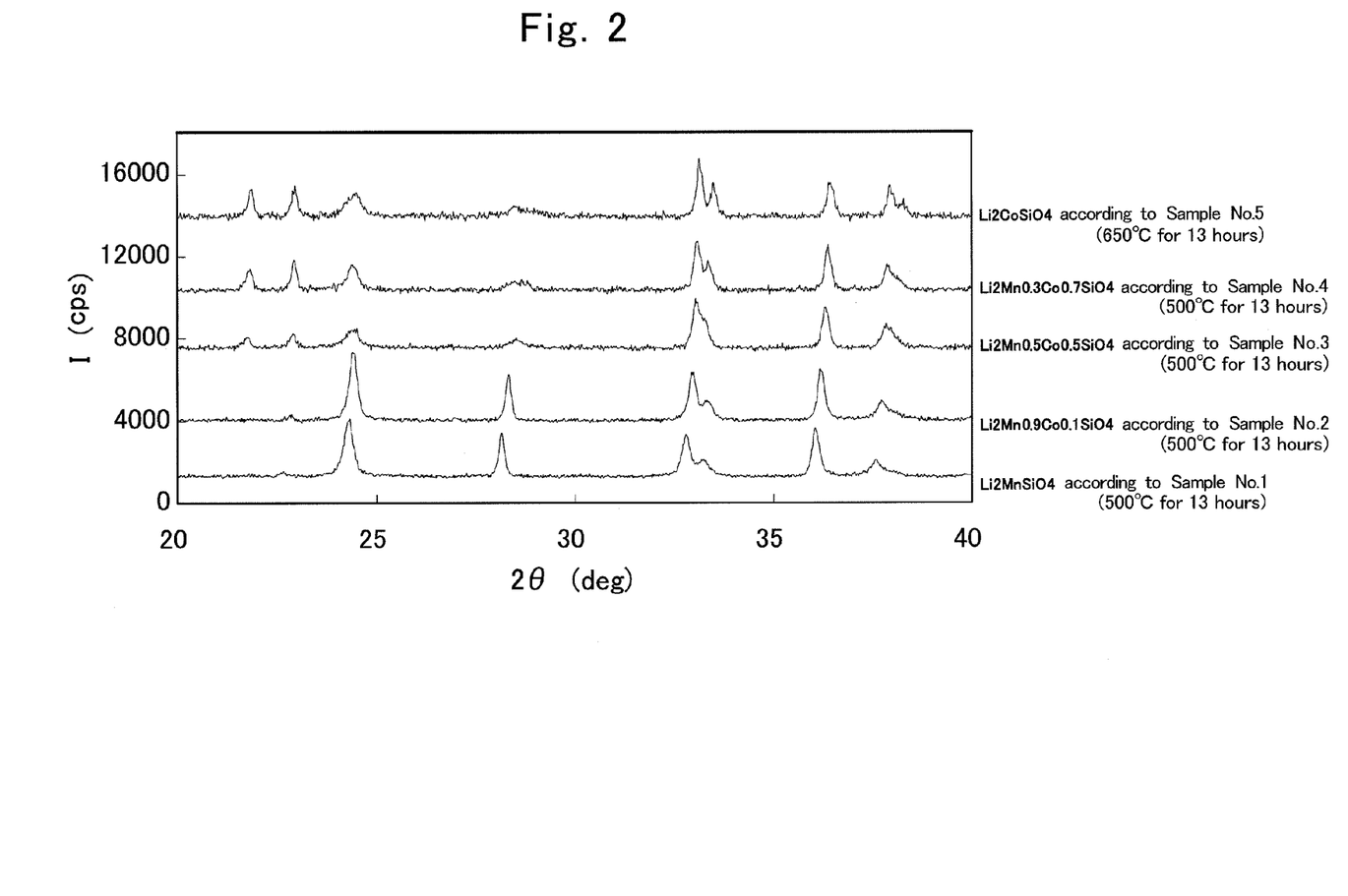
FIG. 2 shows X-ray diffraction patters in which parts at around 2θ=from 20 to 40 degrees in FIG. 1 are magnified.

For the thus obtained powder, an X-ray diffraction measurement was carried out with use of the CuKα ray whose wavelength was 1.54 Å by means of a powder X-ray diffraction apparatus. As shown in FIG. 1 and FIG. 2, although the resulting XRD pattern agreed with the reported pattern of orthorhombic-crystal $Li_2MnSiO_4$ in the space group "Pmn21" virtually, the peaks (24.34-degree, 28.16-degree, 32.84-degree, and 36.08-degree diffraction angles, for instance) shifted to the higher angle side, respectively. From this fact, it was possible to ascertain that Co was introduced into $Li_2MnSiO_4$.

Next, after admixing the thus obtained aforementioned manganese-cobalt-containing lithium silicate-based compound with acetylene black, a heat treatment was carried out onto the compound in the same manner as done in aforementioned Sample No. 1.

Sample No. 3 (where "x"=0.5)

Synthesis of Manganese-Cobalt-Based Deposit

A lithium hydroxide aqueous solution was made by dissolving 2.5-mol lithium hydroxide anhydride (LiOH) in 1,000-mL distilled water. Moreover, a manganese chloride aqueous solution was made by dissolving 0.125-mol manganese chloride tetrahydrate ($MnCl_2.4H_2O$) in 500-mL distilled water. A manganese-cobalt mixed aqueous solution was made by dissolving 0.125-mol cobalt nitrate hydrate (Co$(NO_3)_2.6H_2O$) in the aforementioned manganese chloride aqueous solution. The aforementioned lithium hydroxide aqueous solution was dropped into the resulting mixed aqueous solution gradually at room temperature (e.g., about 20° C.) for over a few hours, thereby generating a manganese-cobalt-based deposit. Thereafter, air was blown into the reaction liquid including the deposit while stirring it, thereby subjecting it to a bubbling treatment at room temperature for one day. After filtering the obtained manganese-cobalt-based deposit, it was then filter washed with distilled water about three times. The washed manganese-cobalt-based deposit was dried at 40° C. for one night.

Synthesis of Manganese-Cobalt-Containing Lithium Silicate-Based Compound

A manganese-cobalt-containing lithium silicate-based compound was obtained in the same manner as done in the (Synthesis of Manganese-Cobalt-containing Lithium Silicate-based Compound) section according to Sample No. 2. For the thus obtained product, an X-ray diffraction measurement was carried out with use of the CuKα ray whose wavelength was 1.54 Å by means of a powder X-ray diffraction apparatus. As shown in FIG. 1 and FIG. 2, although the resulting XRD pattern agreed with the reported pattern of orthorhombic-crystal $Li_2CoSiO_4$ in the space group "Pmn21" virtually, the peaks shifted more to the higher angle side than they did in the XRD pattern according to Sample No. 2, respectively. From this fact, it was possible to ascertain that Co was introduced into $Li_2MnSiO_4$.

Next, after admixing the thus obtained aforementioned manganese-cobalt-containing lithium silicate-based compound with acetylene black, a heat treatment was carried out onto the compound in the same manner as done in aforementioned Sample No. 1.

Sample No. 4 (where "x"=0.7)

Synthesis of Manganese-Cobalt-Based Deposit

A lithium hydroxide aqueous solution was made by dissolving 2.5-mol lithium hydroxide anhydride (LiOH) in 1,000-mL distilled water. Moreover, a manganese chloride aqueous solution was made by dissolving 0.075-mol manganese chloride tetrahydrate ($MnCl_2.4H_2O$) in 500-mL distilled water. A manganese-cobalt mixed aqueous solution was made by dissolving 0.175-mol cobalt nitrate hydrate (Co$(NO_3)_2.6H_2O$) in the aforementioned manganese chloride aqueous solution. The aforementioned lithium hydroxide aqueous solution was dropped into the resulting mixed aqueous solution gradually at room temperature (e.g., about 20° C.) for over a few hours, thereby generating a manganese-cobalt-based deposit. Thereafter, air was blown into the reaction liquid including the deposit while stirring it, thereby subjecting it to a bubbling treatment at room temperature for one day. After filtering the obtained manganese-cobalt-based deposit, it was then filter washed with distilled water about three times. The washed manganese-cobalt-based deposit was dried at 40° C. for one night.

Synthesis of Manganese-Cobalt-Containing Lithium Silicate-Based Compound

A powder of manganese-cobalt-containing lithium silicate-based compound was obtained in the same manner as done in the (Synthesis of Manganese-Cobalt-containing Lithium Silicate-based Compound) section according to Sample No. 2. For the thus obtained powder, an X-ray diffraction measurement was carried out with use of the CuKα ray whose wavelength was 1.54 Å by means of a powder X-ray diffraction apparatus. As shown in FIG. 1 and FIG. 2, although the resulting XRD pattern agreed with the reported pattern of orthorhombic-crystal $Li_2CoSiO_4$ in the space group "Pmn21" virtually, the peaks shifted more to the higher angle side than they did in the XRD pattern according to Sample No. 3, respectively. From this fact, it was ascertained that Co was introduced into $Li_2MnSiO_4$.

Next, after admixing the thus obtained aforementioned manganese-cobalt-containing lithium silicate-based compound with acetylene black, a heat treatment was carried out onto the compound in the same manner as done in aforementioned Sample No. 1.

Sample No. 5 (where "x"=1.0)

Synthesis of Cobalt-Containing Lithium Silicate-Based Compound

A mixed chloride (e.g., $(Li_{0.585}K_{0.415})Cl$) was prepared by melting lithium chloride (LiCl (produced by KISHIDA KAGAKU Co. Ltd., and with 99.0% purity)) and potassium chloride (KCl (produced by KISHIDA KAGAKU Co. Ltd., and with 99.5% purity)) at 400° C. in an $N_2$ atmosphere for an hour and then pulverizing them after weighing them out in a predetermined amount, respectively, and mixing them one another. This mixed chloride, 0.01-mol cobalt chloride ($CoCl_2 \cdot 6H_2O$ (produced by KISHIDA KAGAKU Co. Ltd., and with 99% purity)), 0.01-mol lithium silicate (e.g., $Li_2SiO_3$ (produced by KISHIDA KAGAKU Co. Ltd., and with 99.5% purity)), and 0.01-mol lithium carbonate ($Li_2CO_3$ (produced by KANTO KAGAKU, and with 99.0% purity)) were mixed one another in a mortar after adding 5-mL water to them so as to let a summed amount of the cobalt chloride, lithium silicate and lithium carbonate make a proportion of 330 parts by mass with respect to the mixed chloride taken as 100 parts by mass, and the resulting mixture was then dried at 115° C. The post-drying mixed powder was heated within a golden crucible, and was then further heated to 650° C. under a nitrogen atmosphere in which an $N_2$ flow volume was 100 mL/min, thereby causing the mixed powder to react for 13 hours in a state where the mixed chloride was fused.

After the reaction, the entirety of a reactor core including the golden crucible, namely, the reaction system, was taken from out of an electric furnace, and was then cooled rapidly down to room temperature while keeping letting the mixed gas pass through. Subsequently, the resulting solidified reaction product was grounded with a pestle and mortar after adding water (e.g., 20 mL) to the reaction product. Then, the thus obtained powder was filtered in order to remove salts, and the like, from it after the powder had been caused to dissolve in water, thereby obtaining a powder of cobalt-containing lithium silicate-based compound.

For the thus obtained powder, an X-ray diffraction measurement was carried out with use of the CuKα ray whose wavelength was 1.54 Å by means of a powder X-ray diffraction apparatus. As shown in FIG. 1 and FIG. 2, in the resulting XRD pattern, the peaks shifted more to the higher angle side than they did in the XRD pattern according to Sample No. 4, respectively. The resultant XRD pattern agreed with the reported pattern of orthorhombic-crystal $Li_2CoSiO_4$ in the space group "Pmn21" virtually.

Next, after admixing the thus obtained aforementioned cobalt-containing lithium silicate-based compound with acetylene black, a heat treatment was carried out onto the compound in the same manner as done in aforementioned Sample No. 1.

Compositional Analysis

Compositions of the lithium silicate-based compounds according to Sample Nos. 1 through 5 were analyzed by means of an ICP emission spectroscopy. As an IPC emission spectroscopic analyzing apparatus, "GIROS-120EOP," a product of RIGAKU AND SPECTRO Corporation, was used. Results of the analysis are shown in Table 1 given below.

Sample Nos. 1 through 5 had compositional ratios between the fundamental elements, which were calculated from the blending proportions of the respective raw materials, were as follows: $Li_2MnSiO_4$ for Sample No. 1; $Li_2Mn_{0.9}Co_{0.1}SiO_4$ for Sample No. 2; $Li_2Mn_{0.5}Co_{0.5}SiO_4$ for Sample No. 3; $Li_2Mn_{0.3}Co_{0.7}SiO_4$ for Sample No. 4; and $Li_2CoSiO_4$ for Sample No. 5.

The compositional ratios, which resulted from the ICP analysis for Sample Nos. 1 through 5 that had been synthesized as above, were slightly different from the compositional ratios of Sample Nos. 1 through 5 that were calculated from the blending proportions of the respective raw-material species. It is believed, however, that these differences occurred because of the fact that the elements had inevitably intermingled accidentally or had become deficient during the production processes.

TABLE 1

|  | Mn/Co Molar Ratio | Molten Salt | Result of Compositional Analysis | Initial Discharge Average Voltage (V) |
| --- | --- | --- | --- | --- |
| Sample No. 1 | 1/0 | Carbonate* | $Li_{1.787}NA_{0.026}K_{0.015}Mn_{0.885}SiO_{3.795}$ | 2.88 |
| Sample No. 2 | 0.9/0.1 | Chloride* | $Li_{2.037}K_{0.002}Co_{0.107}Mn_{0.902}SiO_{5.002}Cl_{0.002}$ | 2.93 |
| Sample No. 3 | 0.5/0.5 | " | $Li_{2.023}K_{0.001}Co_{0.503}Mn_{0.508}SiO_{5.009}Cl_{0.002}$ | 2.99 |
| Sample No. 4 | 0.3/0.7 | " | $Li_{2.018}K_{0.002}Co_{0.709}Mn_{0.301}SiO_{5.004}Cl_{0.003}$ | 3.28 |
| Sample No. 5 | 0/1 | " | $Li_{2.058}K_{0.003}Co_{1.190}SiO_{5.229}Cl_{0.003}$ | 2.59 |

Carbonate*: $Li_2CO_3/Na_2CO_3/K_2CO_3$ = 43.5/31.5/25 by molar ratio
Chloride*: $(Li_{0.585}K_{0.415})Cl$ Making of Lithium Secondary Battery Lithium secondary batteries were made using any one of the respective lithium silicate-based compounds according to Sample Nos. 1 through 5.

A mixture was kneaded in which one of the lithium silicate-based compounds, acetylene black (or AB) and polytetrafluoroethyelene (or PTFE) were mixed one another in such a ratio as "Lithium Silicate-based Compound":"AB":"PTFE"=17.1:4.7:1 by mass ratio. This kneaded substance was formed as a film shape, was press attached onto a current collector made of aluminum to make an electrode, and was subjected to vacuum drying at 140° C. for 3 hours. Thereafter, a coin-type lithium secondary battery was manufactured as a prototype product using the following as the electrolytic solution, the separator, and the negative electrode, respectively: a solution in which $LiPF_6$ was dissolved to make 1 mol/L in a mixed solvent in which ethylene carbonate (or EC) and dimethylene polycarbonate (or DMC) were mixed one another in such a ratio as "EC":"DMC"=3:7; a polypropylene membrane (e.g., "Celgard 2400," a product of CELGARD); and lithium metal foil. The resulting batteries, which comprised any one the positive-electrode active materials that had been synthesized by the method according to Sample Nos. 1, 2, 3, 4 and 5, were labeled #1, #2, #3, #4 and #5, respectively.

Charging/Discharging Test

Figure 4:
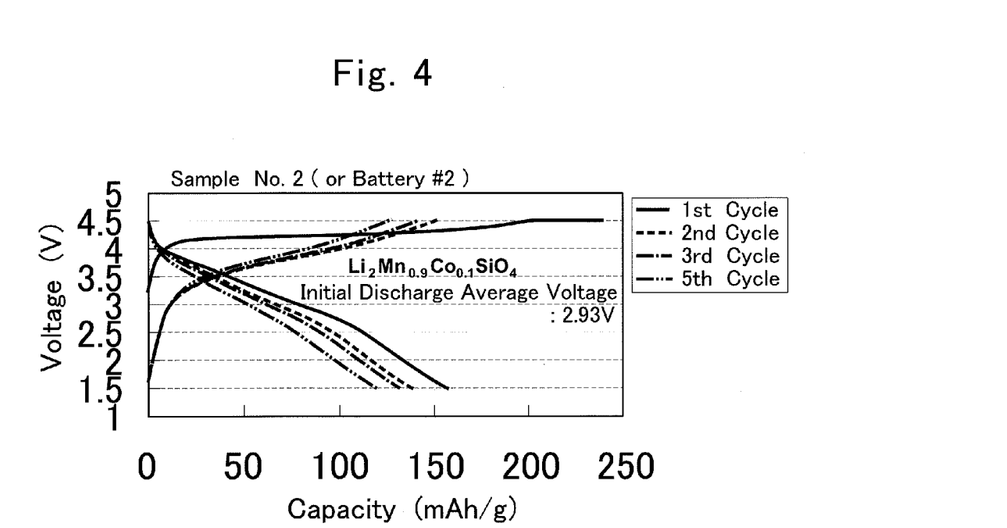
FIG. 4 shows charging and discharging curves of a lithium secondary battery in which the compound obtained by means of the production process according to Sample No. 2 was used as a positive-electrode active material.
Figure 5:
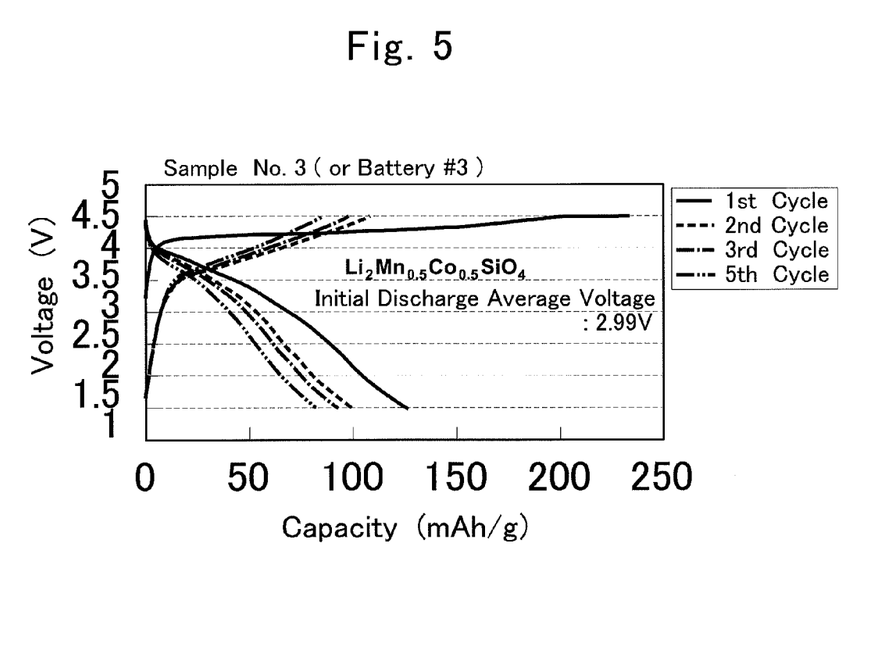
FIG. 5 shows charging and discharging curves of a lithium secondary battery in which the compound obtained by means of the production process according to Sample No. 3 was used as a positive-electrode active material.
Figure 6:
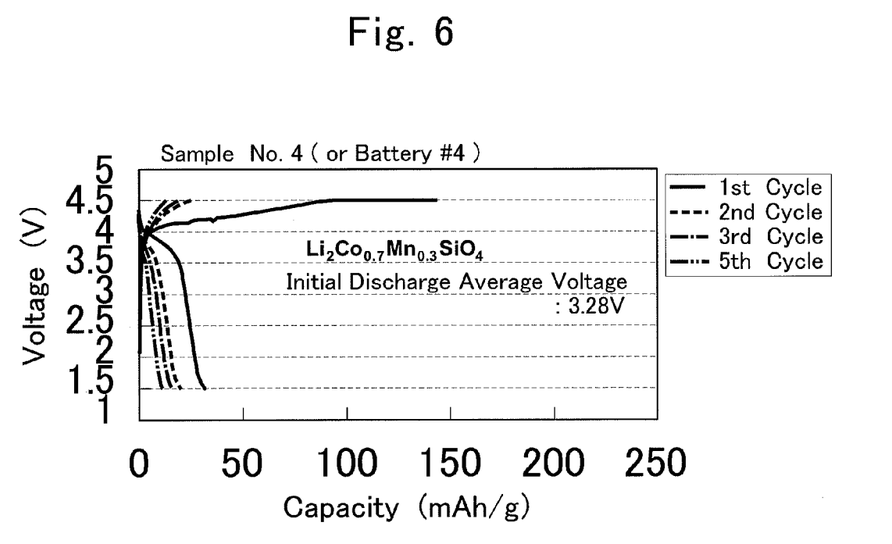
FIG. 6 shows charging and discharging curves of a lithium secondary battery in which the compound obtained by means of the production process according to Sample No. 4 was used as a positive-electrode active material.
Figure 7:
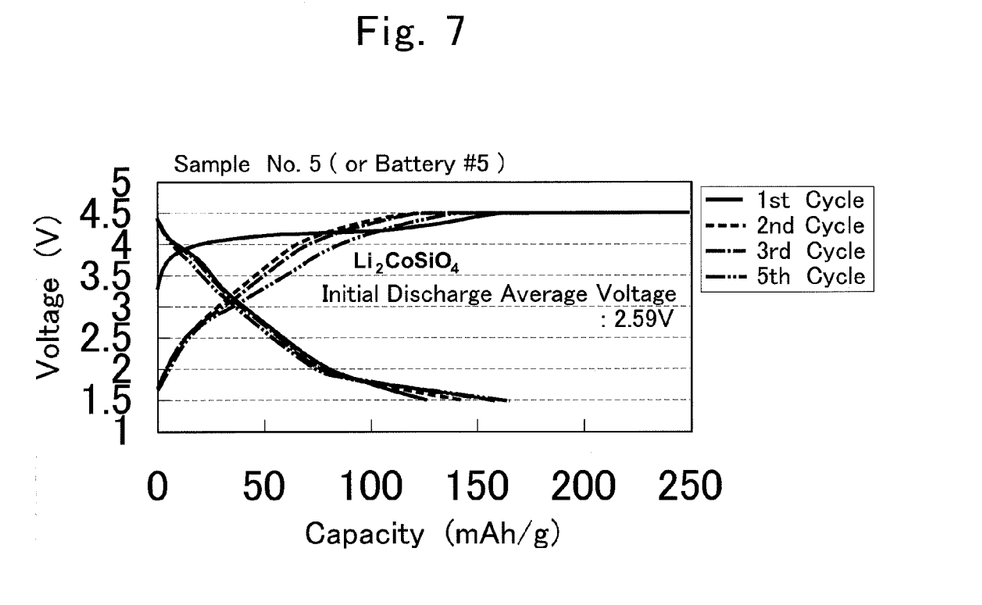
FIG. 7 is shows charging and discharging curves of a lithium secondary battery in which the compound obtained by means of the production process according to Sample No. 5 was used as a positive-electrode active material.

For these lithium secondary batteries, a charging/discharging test was carried out. The testing conditions were set up as follows: the batteries were charged up to a voltage of 4.5 V and then discharged down to 1.5 V repeatedly at 0.1 C (note, however, that the first-round constant-voltage charging was done at 4.5 V for 10 hours). Results of the test are shown in Table 1, and FIG. 3 through FIG. 7. Among FIG. 3 through FIG. 7, the results exhibited by Battery #1 are shown in FIG. 3, the results exhibited by Battery #2 are shown in FIG. 4, the results exhibited by Battery #3 are shown in FIG. 5, the results exhibited by Battery #4 are shown in FIG. 6, and the results exhibited by Battery #5 are shown in FIG. 7. Each of FIG. 3 through FIG. 7 is a diagrammatic representation on the charging and discharging curves from the first to fifth cycle.

In Battery #1 using Sample No. 1 in which the Co introduction amount "x" was 0 (zero), both the discharge capacity during the initial discharging process and that after the fifth cycle were high as shown in FIG. 3. On the other hand, both the initial discharge average voltage and the post-fifth-cycle discharge average voltage were low.

In Battery #2 using Sample No. 2 in which the Co introduction amount "x" was 0.1, the initial discharge average voltage became higher than that in the case of Battery No. 1 as shown in FIG. 4. Moreover, a plateaued (or flat) region was seen in the initial discharging process.

In Battery #3 using Sample No. 3 in which the Co introduction amount "x" was 0.5, the initial discharge average voltage became higher than that in the case of Battery No. 2 as shown in FIG. 5. Moreover, the same plateaued (or flat) region as that exhibited by Battery #2 was seen in the initial discharging process. The discharge capacities declined less than those exhibited by Batteries #1 and #2.

In Battery #4 using Sample No. 4 in which the Co introduction amount "x" was 0.7, the initial discharge average voltage became much higher than that in the case of Battery No. 3 as shown in FIG. 6. On the other hand, the discharge capacities were lower considerably. This is believed to result from the following facts: in Co-rich lithium silicate-based compounds that comprise more Co than Mn, since Co is an active metal, it brings about the decomposition reactions of electrolytic solutions when being charged up to high potentials, so that it is not possible for the lithium silicate-based compounds to demonstrate their inherent charging and discharging characteristics.

In Battery #5 using Sample No. 5 in which the Co introduction amount "x" was 1.0, the first-round and post-fifth-cycle discharge average voltages were quite low as shown in FIG. 7. On the other hand, the battery's capacities were larger than those of Battery #4.

From the above, as the Co introduction amount increased, the discharge average voltage became higher. On the other hand, it was appreciated that the resulting battery's capacities tended to decline when the Co introduction amount exceeded "x"=0.5. Accordingly, it is understood that "x" can preferably fall in such a range as $0<"x"\leq 0.5$, although the present lithium silicate-based compound can be expressed by a general formula, $Li_{(2-a+b)}A_a Mn_{(1-x-y)}Co_x SiO_{(4+\alpha)}Cl_\beta$ (In the formula: "A" is at least one member selected from the group consisting of Na, K, Rb and Cs; and the respective subscripts appear to be as follows: $0\leq"a"<0.2$; $0\leq"b"<1$; $0<"x"<1$; $-0.25\leq"\alpha"\leq 1.25$; and $0\leq"\beta"\leq 0.05$).

2. Investigation into Production Process

Investigations were further conducted into a production process for lithium silicate-based compound comprising $Li_2CoSiO_4$. In addition to above-mentioned Sample No. 5, products, which had been produced by means the following respective production processes, were labeled Sample Nos. 5-1, 5-2, 5-3, and 5-4, respectively. For the resulting respective samples, an X-ray diffraction analysis was carried out in the same manner as done in Sample Nos. 1 through 5. The outcomes are shown in Table 2.

Sample No. 5

For the post-filtering powder according to aforementioned Sample No. 5, an identification of the powder was carried out by means of an XRD method. As a result, the peak of $Li_2CoSiO_4$ serving as the major component could be appreciated, and another peak, which arouse from CoO serving as the minor component, could be appreciated slightly, as shown in Table 2. $Li_2CoSiO_4$ was an orthorhombic crystal, and was available in two types of space groups, namely, "Pmn21" and "Pmnb." From these facts, it was understood that almost all the powder was $Li_2CoSiO_4$, namely, the targeted substance.

Sample No. 5-1

Contrary to Sample No. 5, a lithium silicate-based compound was produced by means of a molten-salt method using a mixed carbonate.

First of all, a carbonate mixture was prepared by mixing lithium carbonate (produced by KISHIDA KAGAKU Co. Ltd., and with 99.0% purity), sodium carbonate (produced by KISHIDA KAGAKU Co. Ltd., and with 99.5% purity) and potassium carbonate (produced by KISHIDA KAGAKU Co. Ltd., and with 99.5% purity) one another in a rate of 43.5:31.5:25 by molar ratio. This carbonate mixture, 0.03 moles of cobalt chloride (e.g., $CoCl_2 \cdot 6H_2O$ (produced by KISHIDA KAGAKU Co. Ltd., and with 99% purity)) and 0.03 moles of lithium silicate (e.g., $Li_2SiO_3$ (produced by KISHIDA KAGAKU Co. Ltd., and with 99.5% purity)) were mixed one another so as to let a summed amount of the cobalt chloride and lithium silicate make a proportion of 160 parts by mass with respect to the carbonate mixture taken as 100 parts by mass. After adding 20-mL acetone to the resulting mixture, the mixture was further mixed by a ball mill made of zirconia at a rate of 500 rpm for 60 minutes, and was then dried. The post-drying mixed powder was heated within a golden crucible to 300° C. under a $CO_2$ atmosphere for 20 minutes, and was then further heated to 500° C. under a mixed-gas atmosphere of carbon dioxide (e.g., 100-mL/min flow volume) and hydrogen (e.g., 3-mL/min flow volume), thereby causing the mixed powder to react for 13 hours in a state where the mixed carbonate was fused.

After the reaction, the entirety of a reactor core including the golden crucible, namely, the reaction system, was taken from out of an electric furnace, and was then cooled rapidly down to room temperature while keeping letting the mixed gas pass through. Subsequently, the resulting solidified reaction product was grounded with a pestle and mortar after adding water (e.g., 20 mL) to the reaction product. Then, the thus obtained powder was filtered in order to remove salts, and the like, from it after the powder had been caused to dissolve in water, thereby obtaining a powder.

Upon analyzing the powder for the components in the same manner done in as Sample No. 5, other than the orthorhombic-crystal $Li_2COSiO_4$ belonging to the "Pmn21" space group, $Li_2SiO_3$ and Co were generated as impurities, as shown in Table 2.

Sample No. 5-2

Contrary to Sample No. 5-1, the reaction by means of the molten salt was carried out under a $CO_2$ atmosphere (e.g., 100-mL/min flow volume). The obtained powder was cooled rapidly in the same manner as done in Sample No. 5-1, was then grounded, and was subjected filtering. Upon analyzing the thus obtained powder for the components in the same manner as done in Sample No. 5, other than the orthorhombic-crystal $Li_2COSiO_4$, the powder included many impurities, such as $Li_2SiO_3$, as shown in Table 2.

Sample No. 5-3

Contrary to Sample No. 5-2, $Li_4SiO_4$ was used in an amount of 0.03 moles as a lithium silicate to be mixed in the molten salt. Moreover, the reaction by means of the molten salt was carried out under a $CO_2$ atmosphere after the temperature had been increased to become 550° C. or more under an $N_2$ atmosphere. The reaction time was set at one hour. The obtained powder was cooled rapidly in the same manner as done in Sample No. 5-1, was then grounded, and was subjected to filtering. Upon analyzing the thus obtained powder for the components in the same manner as done in Sample No. 5, other than the orthorhombic-crystal $Li_2COSiO_4$, the powder included many impurities, such as $Li_2SiO_3$, as shown in FIG. 8 and Table 2.

Sample No. 5-4

Contrary to Sample No. 5-3, the temperature was set at 840° C. in the reaction by means of a solid-phase reaction method. The cobalt-containing substance in the raw material was 0.03-mol cobalt hydroxide ($Co(OH)_2$). The obtained powder was cooled rapidly in the same manner as done in Sample No. 5-1, and was then grounded. Upon analyzing the thus obtained powder for the components in the same manner as done in Sample No. 5, other than the orthorhombic-crystal $Li_2COSiO_4$, the powder included $Li_2SiO_3$ as an impurity, as shown in Table 2.

$A_aMn_{(1-x-y)}Co_xM_ySiO_{(4+\alpha)}Cl_\beta$ (In the formula: "A" is at least one element selected from the group consisting of Na, K, Rb and Cs; "M" is at least one member selected from the group consisting of Mg, Ca, Al, Ni, Fe, Nb, Ti, Cr, Cu, Zn, Zr, V, Mo and W; and the respective subscripts appear to be as follows: $0 \leq$"a"$< 0.2$; $0 \leq$"b"$< 1$; $0 <$"x"$< 1$; $0 \leq$"y"$\leq 0.05$; $-0.25 \leq$"$\alpha$"$\leq 1.25$; and $0 \leq$"$\beta$"$\leq 0.05$), with a higher yield.

Moreover, it was understood that, in the case of carbonate, the higher the reaction temperature becomes the less both the species and amounts of impurities become.

The invention claimed is:

1. A lithium silicate-based compound being characterized in that:
   the lithium silicate-based compound is expressed by a general formula, $Li_{(2-a+b)}A_aMn_{(1-x-y)}Co_xM_ySiO_{(4+\alpha)}Cl_\beta$,
   wherein "A" is at least one element selected from the group consisting of Na, K, Rb and Cs;
   "M" is at least one member selected from the group consisting of Mg, Ca, Al, Ni, Fe, Nb, Ti, Cr, Cu, Zn, Zr, V, Mo and W;
   $0 \leq$"a"$< 0.2$; $0 \leq$"b"$< 1$; $0 <$"x"$< 1$; $0 \leq$"y"$\leq 0.5$; 1-"x"-"y"$> 0$; $-0.25 \leq$"$\alpha$"$\leq 1.25$; and $0 <$"$\beta$"$< 0.05$.

2. The lithium silicate-based compound as set forth in claim 1, wherein the range of "a" in said general formula is $-0.25 \leq$"$\alpha$"$\leq 1.25$, excluding the range $0 <$"$\alpha$"$< 0.3$.

3. The lithium silicate-based compound as set forth in claim 1, wherein "y" in said general formula is zero.

4. The lithium silicate-based compound as set forth in claim 1, wherein the range of "x" in said general formula is $0 <$"x"$\leq 0.5$.

5. The lithium silicate-based compound as set forth in claim 1 having an orthorhombic-crystal crystalline structure.

6. A production process for a lithium silicate-based compound being characterized in that:

TABLE 2

| | Reaction Temperature (° C.) | Reaction Time (hour) | Reaction Atmosphere | Reaction Method | Products |
|---|---|---|---|---|---|
| Sample No. 5 | 650 | 13 | In $N_2$: 100 | Molten-salt Method Mixed Chloride | $Li_2CoSiO_4$ ("Pmn21") Orthorhombic Crystal), $Li_2CoSiO_4$ ("Pmnb" Orthorhombic Crystal), and CoO (minor) |
| Sample No. 5-1 | 500 | 13 | To 300° C. in $CO_2$, and subsequently in $CO_2/H_2$: 100/3 | Molten-salt Method Mixed Carbonate | $Li_2CoSiO_4$ ("Pmn21") Orthorhombic Crystal), $Li_2SiO$, and Co |
| Sample No. 5-2 | 500 | 13 | In $CO_2$: 100 | Molten-salt Method Mixed Carbonate | $Li_2CoSiO_4$ ("Pmn21") Orthorhombic Crystal), $Li_2SiO_3$, $Co_3O_4$, CoO, and $Li_2CoSiO_4$ ("Pmnb" Orthorhombic Crystal) |
| Sample No. 5-3 | 650 | 1 | Temperature Increase in $N_2$, and in $CO_2$ after 550° C. | Molten-salt Method Mixed Carbonate | $Li_2CoSiO_4$ CoO, and $Li_2SiO_3$ |
| Sample No. 5-4 | 840 | 1 | In $N_2$ | Solid-phase Reaction Method | $Li_2CoSiO_4$ ("Pmn21") Orthorhombic Crystal), and $Li_2SiO_3$ |

It was understood from the experiments described above that orthorhombic-crystal $Li_2CoSiO_4$ whose purity is higher is obtainable when a mixed chloride was used as the molten salt. It can be assumed that using a mixed chloride as the molten salt makes it possible to generate not only orthorhombic-crystal $Li_2CoSiO_4$, but also lithium silicate-based compounds that are expressed by a general formula, $Li_{(2-a+b)}$ the process is for producing the lithium silicate-based compound as set forth in claim 1, and comprises a reaction step in which a lithium-silicate compound expressed by $Li_2SiO_3$ and a metallic element-containing substance are caused to react with one another within a molten salt, wherein the metallic element-containing substance includes cobalt (Co) and manganese (Mn), and the molten salt includes at least one member selected from the group consisting of alkali metal chlorides.

7. The production process for the lithium silicate-based compound as set forth in claim 6, wherein said metallic element-containing substance includes a deposit formed by alkalifying a compound aqueous solution that comprises an Mn compound and a Co compound.

8. The production process for the lithium silicate-based compound as set forth in claim 7, wherein said Mn compound includes at least one selected from the group consisting of manganese (II) chloride, manganese (II) nitrate, manganese (II) sulfate, manganese (II) acetate, manganese (III) acetate, manganese (II) acetylacetonate, potassium permanganate, manganese (III) acetylacetonate, and hydrates thereof.

9. The production process for the lithium silicate-based compound as set forth in claim 7, wherein said Co compound includes at least one selected from the group consisting of cobalt (II) chloride, cobalt (II) sulfate, cobalt (II) oxalate, cobalt (II) acetate, cobalt (II) nitrate, cobalt (III) chloride, cobalt (III) nitrate, and hydrates thereof.

10. The production process for the lithium silicate-based compound as set forth in claim 7, wherein said deposit is formed by dropping a lithium hydroxide aqueous solution to said compound aqueous solution.

11. The production process for the lithium silicate-based compound as set forth in claim 6, wherein said lithium-silicate compound and said metallic element-containing substance are caused to react with one another at from 300° C. or more to 700° C. or less.

12. The production process for the lithium silicate-based compound as set forth in claim 6, wherein said alkali metal chlorides include a lithium salt.

13. The production process for the lithium silicate-based compound as set forth in claim 6, wherein said alkali metal chlorides include lithium chloride.

14. The production process for the lithium silicate-based compound as set forth in claim 6, wherein said molten salt is made by mixing multiple members of said alkali metal chlorides with one another.

15. The production process for the lithium silicate-based compound as set forth in claim 6, wherein said metallic element-containing substance includes:

at least one transition metal element selected from the group consisting of manganese and cobalt in an amount of from 50% by mol or more to 100% by mol or less; and at least one metallic element selected from the group consisting of Mg, Ca, Al, Ni, Fe, Nb, Ti, Cr, Cu, Zn, Zr, V, Mo and W in an amount of from 0% by mol to 50% by mol or less;

wherein a summed amount of metallic elements included in the metallic element-containing substance is 100% by mol.

16. The production process for the lithium silicate-based compound as set forth in claim 6 further comprising a removal step in which said alkali metal chloride is removed by means of a solvent after said reaction step.

17. A positive-electrode active material for a secondary battery being characterized in that:

the positive-electrode active material comprises the lithium silicate-based compound as set forth in claim 1, and is able to sorb and desorb lithium ions.

18. A positive-electrode active material for a secondary battery being characterized in that:

the positive-electrode active material comprises the lithium silicate-based compound obtained by means of the process as set forth in claim 6, and is able to sorb and desorb lithium ions.

19. A positive electrode for a secondary battery being characterized in that:

the positive electrode comprises the positive-electrode active material for a secondary battery as set forth in claim 17.

20. A positive electrode for a secondary battery being characterized in that:

the positive electrode comprises the positive-electrode active material for a secondary battery as set forth in claim 18.

21. A secondary battery being characterized in that:

the secondary battery comprises the positive electrode for a secondary battery as set forth in claim 19 as a constituent element.

22. A secondary battery being characterized in that:

the secondary battery comprises the positive electrode for a secondary battery as set forth in claim 20 as a constituent element.

* * * * *